United States Patent
Bak et al.

(10) Patent No.: US 9,953,645 B2
(45) Date of Patent: Apr. 24, 2018

(54) VOICE RECOGNITION DEVICE AND METHOD OF CONTROLLING SAME

(71) Applicant: SAMSUNG ELECTRONICS CO., LTD., Suwon-si (KR)

(72) Inventors: Eun-Sang Bak, Ansan-si (KR); Kyung-duk Kim, Suwon-si (KR); Myung-jae Kim, Suwon-si (KR); Yu Liu, Suwon-si (KR); Seong-han Ryu, Seoul (KR); Geun-bae Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 153 days.

(21) Appl. No.: 14/650,471

(22) PCT Filed: Dec. 9, 2013

(86) PCT No.: PCT/KR2013/011321
§ 371 (c)(1),
(2) Date: Jun. 8, 2015

(87) PCT Pub. No.: WO2014/088377
PCT Pub. Date: Jun. 12, 2014

(65) Prior Publication Data
US 2015/0310855 A1    Oct. 29, 2015

Related U.S. Application Data

(60) Provisional application No. 61/734,644, filed on Dec. 7, 2012.

(30) Foreign Application Priority Data

Dec. 6, 2013    (KR) .................... 10-2013-0151129

(51) Int. Cl.
*G10L 15/00*    (2013.01)
*G10L 15/22*    (2006.01)
(Continued)

(52) U.S. Cl.
CPC .......... *G10L 15/22* (2013.01); *G10L 15/1822* (2013.01); *G10L 2015/228* (2013.01)

(58) Field of Classification Search
USPC .... 704/277, 275, 270, 255, 257, 9; 348/732; 379/406.08, 88.01, 88.03; 707/3;
(Continued)

(56) References Cited

U.S. PATENT DOCUMENTS 6,901,366 B1 * 5/2005 Kuhn ................ G06F 17/30663
                                                                704/257
7,305,624 B1 * 12/2007 Siegel ................ G06F 3/04817
                                                                715/733
(Continued)

FOREIGN PATENT DOCUMENTS

JP       2008-58813 A       3/2008
KR    10-2007-0102267 A    10/2007
(Continued)

OTHER PUBLICATIONS

Int. Search Report dated Mar. 27, 2014 issued in Int. Application No. PCT/KR2013/011321 (PCT/ISA/210).
(Continued)

*Primary Examiner* — Neeraj Sharma
(74) *Attorney, Agent, or Firm* — Sughrue Mion, PLLC

(57) ABSTRACT

A voice recognition device includes an extractor configured to extract at least one of a first utterance element indicating an execution command and a second utterance element indicating a subject, from a user's voice utterance, a domain determiner configured to determine a current domain to provide response information regarding the voice utterance based on the first and the second utterance elements, and a controller configured to determine a candidate conversation frame to provide the response information regarding the voice utterance on at least one of the current domain and a (Continued)

310

| | | | |
|---|---|---|---|
| PREVIOUS DOMAIN: VOD<br>PREVIOUS UTTERANCE: WHAT ANIMATION IS ON VIDEO ON DEMAND? [(search_program (genre=animation))]<br>CURRENT DOMAIN: VOD<br>CURRENT UTTERANCE: SHOW ME CONTENT SORTED BY AGE GROUP [search_program (content_rating)] | | | |
| | CONTINUED VOD CONVERSATION CONTEXT | - | - |
| CONVERSATION FRAME | search_program (content_rating) | - | - |

320 previous domain based on a conversation state of the current domain, wherein the previous domain is determined from a previous voice utterance of the user.

18 Claims, 7 Drawing Sheets

(51) Int. Cl.

| | |
|---|---|
| *G10L 25/00* | (2013.01) |
| *G06F 17/27* | (2006.01) |
| *G10L 21/02* | (2013.01) |
| *G10L 21/00* | (2013.01) |
| *G10L 15/26* | (2006.01) |
| *G06F 3/048* | (2013.01) |
| *G06F 3/00* | (2006.01) |
| *H04M 3/42* | (2006.01) |
| *G09B 19/04* | (2006.01) |
| *H04N 5/445* | (2011.01) |
| *H04N 7/173* | (2011.01) |
| *H04H 60/32* | (2008.01) |
| *G10L 15/18* | (2013.01) |

(58) Field of Classification Search
USPC .................................................... 455/414.1
See application file for complete search history.

(56) References Cited

U.S. PATENT DOCUMENTS

| | | | | |
|---|---|---|---|---|
| 7,480,619 | B1* | 1/2009 | Scott | 704/275 |
| 8,140,327 | B2* | 3/2012 | Kennewick | G10L 15/22 379/406.08 |
| 9,473,809 | B2* | 10/2016 | Fan | H04N 7/157 |
| 2003/0229900 | A1* | 12/2003 | Reisman | G06F 17/30873 725/87 |
| 2004/0179659 | A1* | 9/2004 | Byrne | H04M 1/645 379/88.18 |
| 2004/0225650 | A1* | 11/2004 | Cooper | H04M 3/527 |
| 2005/0033582 | A1* | 2/2005 | Gadd | G06Q 30/02 704/277 |
| 2005/0257236 | A1* | 11/2005 | Ando | G01C 21/36 725/37 |
| 2007/0033005 | A1* | 2/2007 | Cristo | G06F 17/279 704/9 |
| 2012/0010876 | A1 | 1/2012 | Smolenski et al. | |
| 2012/0019732 | A1* | 1/2012 | Lee | G06F 17/30274 348/732 |
| 2012/0034904 | A1* | 2/2012 | LeBeau | G10L 15/265 455/414.1 |
| 2012/0156660 | A1 | 6/2012 | Kwon et al. | |

FOREIGN PATENT DOCUMENTS

| | | |
|---|---|---|
| KR | 10-2010-0030223 A | 3/2010 |
| KR | 10-2012-0075585 A | 7/2012 |

OTHER PUBLICATIONS

Written Opinion dated Mar. 27, 2014 issued in Int. Application No. PCT/KR2013/011321 (PCT/ISA/237).

* cited by examiner

FIG. 3

| | | | 310 |
|---|---|---|---|
| PREVIOUS DOMAIN: VOD<br>PREVIOUS UTTERANCE: WHAT ANIMATION IS ON VIDEO ON DEMAND? [(search_program (genre=animation))]<br>CURRENT DOMAIN: VOD<br>CURRENT UTTERANCE: SHOW ME CONTENT SORTED BY AGE GROUP [search_program (content_rating)] | | | |
| | CONTINUED VOD CONVERSATION CONTEXT | - | - |
| CONVERSATION FRAME | search_program (content_rating) | - | - |

| | CONTINUED VOD CONVERSATION CONTEXT | CONTINUED TV PROGRAM CONVERSATION CONTEXT | - |
|---|---|---|---|
| CONVERSATION FRAME | play_program (title= animation 000) | search_program (title= animation 000) | - |

PREVIOUS DOMAIN: VOD
PREVIOUS UTTERANCE: WHAT ANIMATION IS ON VIDEO ON DEMAND? [(search_program (genre=animation))]
CURRENT DOMAIN: TV PROGRAM, VOD
CURRENT UTTERANCE: SHOW ME ANIMATION 000 [search_program (title=animation 000)]

FIG. 5

| | CONTINUED VOD CONVERSATION CONTEXT | INITIALIZED VOD CONVERSATION CONTEXT | - |
|---|---|---|---|
| CONVERSATION FRAME | search_program (genre=action animation) | search_program (genre=action) | - |

510

PREVIOUS DOMAIN: VOD
PREVIOUS UTTERANCE: WHAT ANIMATION IS ON VIDEO ON DEMAND? [(search_program (genre=animation))]
CURRENT DOMAIN: VOD
CURRENT UTTERANCE: WHAT ACTION MOVIES ARE ON VIDEO ON DEMAND? [search_program (genre=action)]

| | CONTINUED TV PROGRAM CONVERSATION CONTEXT | CONTINUED VOD CONVERSATION CONTEXT | INITIALIZED TV PROGRAM CONVERSATION CONTEXT |
|---|---|---|---|
| CONVERSATION FRAME | search_program (genre= animation) | search_program() | search_program() |

610:
PREVIOUS DOMAIN: VOD
PREVIOUS UTTERANCE: WHAT ANIMATION IS ON VIDEO ON DEMAND? [(search_program (genre=animation))]
CURRENT DOMAIN: TV PROGRAM
CURRENT UTTERANCE: THEN, WHAT TV PROGRAMS ARE ON? [search_program ()]

620, 630, 640

VOICE RECOGNITION DEVICE AND METHOD OF CONTROLLING SAME

CROSS-REFERENCE TO RELATED APPLICATION

This application is a National Stage entry of International Application No. PCT/KR2013/011321, filed Dec. 9, 2013, which claims priority from Korean Patent Application No. 10-2013-0151129, filed on Dec. 6, 2013, in the Korean Intellectual Property Office, which claims the benefit of U.S. Provisional Patent Application No. 61/734,644, filed Dec. 7, 2012 in the United States Patent and Trademark Office, the entire disclosures of which are hereby incorporated by reference.

BACKGROUND

1. Field

The disclosed exemplary embodiments relate to a voice recognition device and a method for providing response information, and more specifically, to a voice recognition device configured to provide response information corresponding to a user's voice utterance and a method for providing response information.

2. Description of Related Art

Currently, a voice recognition device providing response information regarding user's voice utterance determines a domain according to the user's intention by analyzing the received voice utterance when the user's voice utterance is received, and provides response information regarding the user's voice utterance based on the determined domain.

However, the voice recognition device determines the domain based on the current voice utterance of a user, and provides response information regarding the user's voice utterance based on the determined domain. Thus, instead of considering conversation context between user's previous voice utterance and user's current voice utterance, the voice recognition device provides response information regarding the user's voice utterance by determining the user's intention according to the user's current voice utterance.

For example, a previous voice utterance of "What action movies are on?" may include the user's intention regarding an action movie provided from TV programming. Thereafter, when a current voice utterance of "Then, what is on Video on Demand?" is inputted, the voice recognition device does not consider conversation context related with the previous voice utterance, but determines the user's intention based on the currently inputted voice utterance. As described above, the voice recognition device does not correctly determine the user's intention from the current voice utterance of "Then, what is on Video on Demand?" because there is no spoken subject to be implemented regarding the current voice utterance of "Then, what is on Video on Demand?" Thus, the voice recognition device may provide different response information from the user's intention or request the utterance again from a user. A user be inconvenienced because he or she must speak a new voice utterance in order to receive the intended response information.

SUMMARY

According to an aspect of an exemplary embodiment, voice recognition device includes an extractor configured to extract at least one of a first utterance element indicating an execution command and a second utterance element indicating a subject, from a user's voice utterance, a domain determiner configured to determine a current domain to provide response information regarding the voice utterance based on the first and the second utterance elements, and a controller configured to determine a candidate conversation frame to provide the response information regarding the voice utterance on at least one of the current domain and a previous domain based on a conversation state of the current domain, wherein the previous domain is determined from a previous voice utterance of the user.

The domain determiner is further configured to determine the current domain to provide response information regarding the voice utterance based on a main action and parameters corresponding to the first and the second utterance elements extracted by the extractor.

The controller is further configured to determine whether or not the current domain and the previous domain are the same and whether the conversation context is converted from the current conversation frame and previous conversation frame generated regarding the previous domain, and determine a candidate conversation frame to provide response information regarding the voice utterance on at least one of the current domain and the previous domain.

When the current domain and the previous domain are the same and when the conversation context is not converted between the current domain and the previous domain, the controller is further configured to determine the candidate conversation frame regarding the current conversation frame based on the previous conversation frame.

When the current domain and the previous domain are different and when the conversation context is not converted between the current domain and the previous domain, the controller is further configured to determine the candidate conversation frame regarding the current conversation frame on the previous and the current domains based on the previous conversation frame.

When the current domain and the previous domain are the same and when the conversation context is converted between the two domains, the controller is further configured to determine the candidate conversation frame from at least one of the current conversation frame and an initialized conversation frame which is initialized in relation with the current conversation frame on the previous domain.

When the current domain and the previous domain are different and when the conversation context is converted between the two domains, the controller is further configured to determine at least one of a candidate conversation frame regarding the current conversation frame based on the previous conversation frame, a candidate conversation frame regarding the current conversation frame on the previous domain, and a candidate conversation frame regarding the initialized conversation frame initialized in relation with the current conversation frame on the current domain.

The device can further include a memory configured to store conversation example information related with the previous conversation frame matched for each domain, and counting information relating to the frequency regarding the voice utterance related with the conversation example information.

The controller is further configured to determine ranking of the candidate conversation frame based on the counting information matched with the conversation example information for each of the at least one previous conversation frame stored in the memory, and provide response information regarding the candidate conversation frame in the order of higher-ranking candidate conversation frame.

The memory is further configured to store indexing information to index at least one utterance element included in the conversation example information for each of at least one previous conversation frame, and the controller is further configured to provide response information regarding the candidate conversation frame in the order of larger number of the indexing information among the candidate conversation frames to provide response information regarding the voice utterance by considering the indexing information of the conversation example information for each of the at least one previous conversation frame stored in the storage.

According to another aspect of an exemplary embodiment, method of controlling a voice recognition device can include extracting at least one of a first utterance element indicating an execution command and a second utterance element indicating a subject from a voice utterance of a user, determining a current domain to provide a response information regarding the voice utterance based on the first and the second utterance elements, determining a candidate conversation frame to provide the response information regarding the voice utterance on at least one of a current domain and a previous domain, based on a conversation state on the current domain and the previous domain, wherein the previous domain is determined from a previous voice utterance of the user, and providing the response information regarding the voice utterance based on the candidate conversation frame.

The determining can include determining the current domain to provide response information regarding the voice utterance based on a main action and parameters corresponding to the extracted first and second utterance elements.

The providing can include determining whether or not the current domain and the previous domain are the same and whether a conversation context is converted from the current conversation frame and a previous conversation frame generated regarding the previous domain, and determines a candidate conversation frame to provide response information regarding the voice utterance on at least one of the current and the previous domains.

When the current domain and the previous domain are the same and when the conversation context is not converted between the two domains, the providing can include determining a candidate conversation frame regarding the current conversation frame based on the previous conversation frame.

When the current domain and the previous domain are different and when the conversation context is not converted between the two domains, the providing can include determining a candidate conversation frame regarding the current conversation frame on the previous and the current domains based on the previous conversation frame.

When the current domain and the previous domain are the same and when the conversation context is converted between the two domains, the providing can include determining a candidate conversation frame from at least one of the current conversation frame and an initialized conversation frame which is initialized in relation with the current conversation frame on the previous domain.

When the current domain and the previous domain are different and when the conversation context is converted between the two domains, the providing can include determining at least one of a candidate conversation frame regarding the current conversation frame based on the previous conversation frame, a candidate conversation frame regarding the current conversation frame on the previous domain, and a candidate conversation frame regarding the initialized conversation frame initialized in relation with the current conversation frame on the current domain.

The method can further include matching and storing conversation example information related with the previous conversation frame matched for each domain, and counting information relating to the frequency regarding the voice utterance related with the conversation example information.

The method can further include determining ranking of the candidate conversation frame based on the counting information matched with the conversation example information for each of the at least one previous conversation frame, and providing response information regarding the candidate conversation frame in the order of higher-ranking candidate conversation frame.

The method can further include storing indexing information to index at least one utterance element included in the conversation example information for each of at least one previous conversation frame; and providing response information regarding the candidate conversation frame in the order of larger number of the indexing information among the candidate conversation frames to provide response information regarding the voice utterance by considering the indexing information of the conversation example information for each of the at least one previous conversation frame.

BRIEF DESCRIPTION OF THE DRAWINGS

The above and/or other aspects will become apparent and more readily appreciated from the following detailed description, taken in conjunction with the accompanying drawings of which:

FIG. 3 is a diagram in which the voice recognition device determines a candidate conversation frame to provide response information regarding user's voice utterance according to an exemplary embodiment;

FIG. 4 is a diagram in which the voice recognition device determines a candidate conversation frame to provide response information regarding the user's voice utterance according to another exemplary embodiment;

FIG. 5 is a diagram in which the voice recognition device determines a candidate conversation frame to provide response information regarding the user's voice utterance according to another exemplary embodiment;

FIG. 6 is a diagram in which the voice recognition device determines a candidate conversation frame to provide response information regarding the user's voice utterance according to another exemplary embodiment.

DETAILED DESCRIPTION OF EXEMPLARY EMBODIMENTS

The exemplary embodiments will be explained in greater detail below with reference to the drawings.

Figure 1:
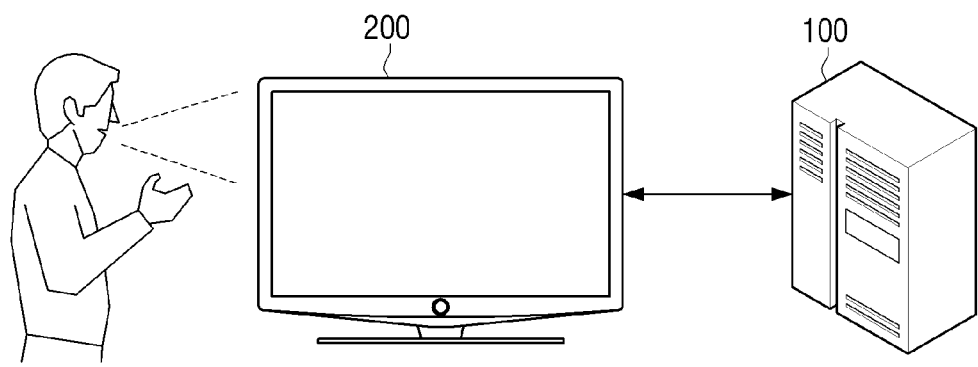
FIG. 1 is an exemplary diagram of an interactive system according to an exemplary embodiment.

FIG. 1 is an exemplary diagram of an interactive system according to an exemplary embodiment.

Referring to FIG. 1, the interactive system may include a voice recognition device 100 and a display apparatus 200. The voice recognition device 100 may receive user's voice utterance signals (hereinbelow, 'voice utterance') from the display apparatus 200, and determine a domain to which the received voice utterance belongs. Thereafter, the voice recognition device 100 may generate response information regarding the user's voice utterance based on conversation pattern between the determined domain (hereinbelow, 'current domain') and previous domain determined from the previous voice utterance of a user, and transmit the same to the display apparatus 200.

The display apparatus 200 may be a smart TV. However, this is merely one embodiment; various electronic devices may be used, such as, a mobile phone such as a smart phone, a desktop PC, a laptop PC, or a GPS. The display apparatus 200 may collect a user's voice utterance, and transmit the collected user's voice utterance to the voice recognition device 100. Accordingly, the voice recognition device 100 may determine a current domain to which the received user's voice utterance belongs, generate response information regarding the user's voice utterance based on conversation pattern between the determined current domain and the previous domain determined from the previous user's voice utterance, and transmit a result to the display apparatus 200. Thus, the display apparatus 200 may output the response information received from the voice recognition device 100, through a speaker, or a display on the screen.

Specifically, the voice recognition device 200 may analyze the received voice utterance and determine a current domain regarding the voice utterance when user's voice utterance is received from the display apparatus 200. Thereafter, the voice recognition device 100 may provide response information regarding the user's voice utterance on at least one of the current domain and the previous domain based on a conversation state between the previous domain determined from the previous voice utterance of the corresponding user and the current domain.

Specifically, the voice recognition device 100 may determine whether the previous domain and the current domain match. When the two domains match, the voice recognition device 100 may determine whether uniform conversation context is maintained, by analyzing conversation pattern between the two domains. When a result of the determination indicates that the uniform conversation context is maintained, the voice recognition device 100 may generate response information regarding the current user's voice utterance on the previous domain, and transmit the generated information to the display apparatus 200.

However, when the result of analyzing the conversation pattern between the two domains indicates that the conversation context is converted, or that the uniform conversation context is maintained on different domains, or that the conversation context is converted between different domains, the voice recognition device 100 may provide response information regarding the user's voice utterance based on the current conversation frame regarding the user's current voice utterance and previous conversation frame regarding the previous voice utterance of corresponding user on the two domains.

For example, a user's voice utterance speaking "Then, what TV programs are on?" may be received, after the Video on Demand domain has been determined to be the previous domain from the previous user's voice utterance speaking "What animation is on Video on Demand?" In the above example, the voice recognition device 100 may extract a first utterance element indicating the execution command of "TV program," based on the voice utterance of "Then, what TV programs are on?," and generate current conversation frame of search_program( ) based on the extracted first utterance element. Further, the voice recognition device 100 may determine the TV program domain to be the current domain to provide to user's voice utterance, based on the voice utterance speaking "Then, what TV programs are on?"

When the current domain is determined, the voice recognition device 100 may compare the previous domain with the current domain. When the two domains are different, the voice recognition device 100 may determine whether to convert conversation context by analyzing conversation pattern between the two domains. As described above, the user's voice utterance on the Video on Demand domain, which is the previous domain, may be "What animation is on Video on Demand?" and the user's voice utterance on the TV program domain, which is the current domain, may be "Then, what TV programs are on?" Thus, when the two domains are different and when conversation context is converted between the two domains, the voice recognition device 100 may determine a plurality of candidate conversation frames to provide response information regarding the user's current voice utterance on the two domains. Herein, the candidate conversation frame may be previous conversation frame generated from the user's previous voice utterance, current conversation frame generated from the current voice utterance, and initialized conversation frame related with the current conversation frame.

When a plurality of the candidate conversation frames are determined, the voice recognition device 100 may generate response information regarding the user's voice utterance based on the candidate conversation frame determined for each domain, and transmit the generated information to the display apparatus 200.

The voice recognition device 100 according to an exemplary embodiment may provide response information regarding the user's voice utterance by applying a number of various cases, even when the current user's voice utterance is unrelated to the previous utterance or when the user's intention is unclear because the domains related with the above two utterance are different.

The above briefly describes the interactive system according to an exemplary embodiment. The following will explain the voice recognition device 100 providing response information corresponding to the user's voice utterance in an interactive system according to an exemplary embodiment.

Figure 2:
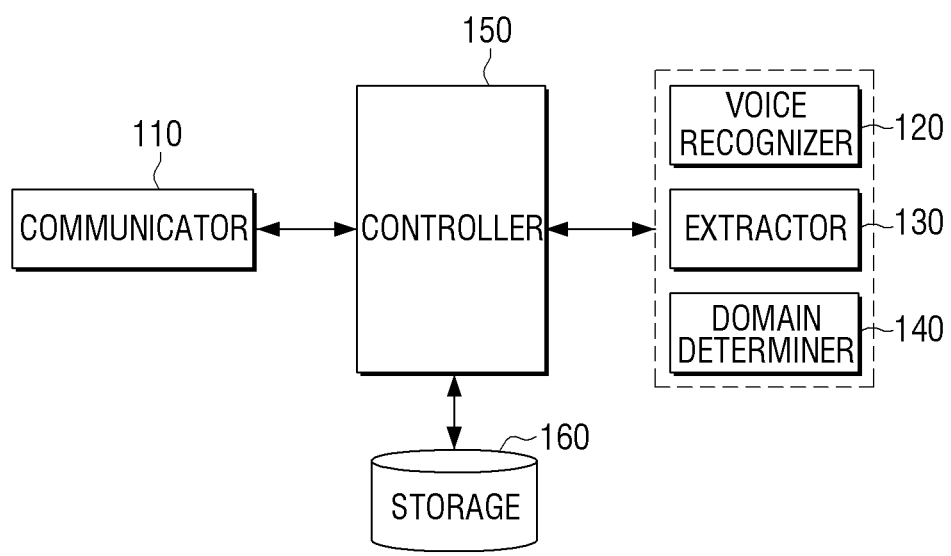
FIG. 2 is a block diagram of a voice recognition device according to an exemplary embodiment.

FIG. 2 is a block diagram of a voice recognition device 100 according to an exemplary embodiment.

Referring to FIG. 2, the voice recognition device 100 includes a communicator 110, a voice recognizer 120, an extractor 130, a domain determiner 140, a controller 150, and a storage 160.

The communicator 110 may receive the user's voice utterance recognized through the display apparatus 200 by performing data communication through wires or wirelessly with the display apparatus 200, generate response information corresponding to the received voice utterance, and transmit the generated information to the display apparatus 200. Herein, the response information may include information related with the contents requested by a user or keyword search result information.

The communicator 110 may include various communication modules, such as a near field wireless communication module and a wireless communication module. Herein, the near field wireless communication module is a module to perform communication with an external device placed within near distance according to the near field wireless communication methods such as BLUETOOTH and ZIG-BEE. Further, the wireless communication module is a module to perform communication by being connected to external network according to the wireless communication protocols, such as WIFI and IEEE. Besides these, the wireless communication module may further include a mobile communication module to perform communication, while being connected to mobile communication network according to the various mobile communication standards such as 3G ($3^{rd}$ Generation), 3GPP ($3^{rd}$ Generation Partnership Project), or LTE (Long Term Evolution).

The voice recognizer 120 may recognize the user's voice utterance received from the display apparatus 200 through the communicator 110, and convert the voice utterance into text. According to an exemplary embodiment, the voice recognizer 120 may convert the received user's voice utterance into text by using speech to text (STT) algorithms. When the user's voice utterance is converted into text through the voice recognizer 120, the extractor 130 may extract utterance elements from the text. Specifically, the extractor 130 may extract utterance elements from the converted text of the user's voice utterance based on corpus tables stored in the storage 160. Herein, the utterance elements are keywords to perform the operation requested by a user within the user's voice utterance. The utterance elements may be classified into a first utterance element indicating execution commands and a second utterance element indicating main features (i.e., a subject). For example, regarding the user's voice utterance speaking "Show me action movies!," the extractor 130 may extract the first utterance element of the execution command indicated by "Show" and the second utterance element of the subject indicated by "action movies."

When at least one utterance element is extracted among the first and the second utterance element, the domain determiner 140 may determine current domain to provide response information regarding the user's voice utterance based on main action and parameters corresponding to the extracted first and second utterance elements from the extractor 130. Specifically, the domain determiner 140 may generate a conversation frame (hereinbelow, "current conversation frame") based on main action and parameters corresponding to the extracted first and second utterance elements from the extractor 130. When the current conversation frame is generated, the domain determiner 140 may determine a current domain to which the current conversation frame belongs, by considering the domain tables stored in the storage 160.

Herein, respectively regarding a plurality of the preset domains, the domain tables may be matched with the conversation frame generated based on the main action corresponding to the extracted first utterance element and the parameters corresponding to the second utterance element from the previous user's voice utterance. Thus, when the current conversation frame is generated, the domain determiner 140 may obtain at least one domain to which the current conversation frame belongs by considering the previously stored domain tables in the storage 160, and determine the obtained domain to be current domain.

Meanwhile, the controller 150 may control the overall operation regarding each component of the voice recognition device 100. Specifically, the controller 150 may determine a candidate conversation frame to provide response information regarding the user's voice utterance on at least one of the current and the previous domain based on conversation state between the current domain determined through the domain determiner 140 and the previous domain determined from the previous voice utterance of the user.

Specifically, the controller 150 may determine whether the current domain and the previous domain are the same and whether conversation context is converted from the current conversation frame and the previous conversation frame generated regarding the previous domain. Thereafter, the controller 150 may determine a candidate conversation frame to provide response information regarding the user's voice utterance on at least one of the current and the previous domain as a result of determining whether the two domains are the same and whether conversation context is converted.

According to an exemplary embodiment, when the current domain and the previous domain are determined to be the same and when conversation context is determined not to be converted between the two domains, the controller 150 may determine a candidate conversation frame regarding the current conversation frame based on the previous conversation frame.

Meanwhile, when the current domain and the previous domain are determined to be different and when conversation context is determined not to be converted between the two domains, the controller 150 may determine a candidate conversation frame regarding the current conversation frame on the previous and the current domain based on the previous conversation frame.

Meanwhile, when the current domain and the previous domain are determined to be the same and when conversation context is determined to be converted between the two domains, the controller 150 may determine a candidate conversation frame related with at least one conversation frame among the current conversation frame on the previous domain and the initialized conversation frame regarding the current conversation frame.

Meanwhile, when the current domain and the previous domain are determined to be different and when conversation context is determined to be converted between the two domains, the controller 150 may determine at least one of a candidate conversation frame regarding the current conversation frame based on the previous conversation frame, a candidate conversation frame regarding the current conversation frame on the previous domain, and a candidate conversation frame regarding the initialized conversation frame related with the current conversation frame on the current domain.

Accordingly, when at least one candidate conversation frame is determined according to whether the current domain and the previous domain are the same and whether conversation context is converted between the two domains, the controller 150 may generate response information regarding the determined candidate conversation frame, and transmit the generated response information to the display apparatus 200.

The following will specifically explain operation of determining a candidate conversation frame to provide response information regarding the user's voice utterance based on user's voice utterance and previous voice utterance, by referring to FIGS. 3 to 6.

FIG. 3 is a diagram in which the voice recognition device determines a candidate conversation frame to provide response information regarding the user's voice utterance according to an exemplary embodiment.

Referring to FIG. 3, when the determined domains are determined to coincide regarding the user's previous and the current voice utterance and when conversation context is determined not to be converted between the two domains, the controller 150 may determine a candidate conversation frame regarding the current conversation frame based on the previous conversation frame.

For example, as illustrated in conversation context area 310, the previous user's voice utterance may be "What animation is on Video on Demand?", the previous conversation frame generated based on the utterance elements extracted from the previous voice utterance may be search_program (genre=animation), and the previous domain determined based on the previous conversation frame may be Video on Demand domain. Further, the user's current voice utterance may be "Show me content sorted by age group," the current conversation frame generated based on the utterance elements extracted from the current voice utterance may be search_program (content_rating), and the current domain determined based on the current conversation frame may be Video on Demand domain.

In the above example, the controller 150 may determine the domains determined regarding the user's previous and the current voice utterance to be Video on Demand domains. Further, the controller 150 may determine that conversation context is not converted between the two domains by analyzing user's conversation pattern from the previous conversation frame of search_program (genre=animation) and the current conversation frame of search_program (content_rating). Thus, the controller 150 may determine that the current user's voice utterance is continued from the previous voice utterance in view of Video on Demand conversation context.

Accordingly, when the domains determined regarding the previous and the current user's voice utterance are determined to be the same and when conversation context is determined not to be converted between the two domains, the controller 150 may determine a candidate conversation frame 320 to provide response information regarding the user's voice utterance on Video on Demand domain which is previous domain.

Specifically, the controller 150 may determine the current conversation frame of search_program (content_rating) to be candidate conversation frame 320 based on the previous conversation frame of search_program (genre=animation).

When the candidate conversation frame 320 is determined, the controller 150 may perform searching regarding the animations for all age group among the previously searched animations on Video on Demand domain, which is previous domain based on the previous conversation frame of search_program (genre=animation), and the determined candidate conversation frame 320 of search_program (content_rating), generate response information including the search result information, and transmit the search result to the display apparatus 200.

FIG. 4 is a diagram in which the voice recognition device determines a candidate conversation frame to provide response information regarding the user's voice utterance according to another exemplary embodiment.

Referring to FIG. 4, when the current and the previous domain are determined to be different and when conversation context is determined not to be converted between the two domains, the controller 150 may determine a candidate conversation frame regarding the current conversation frame on the two domains based on the previous conversation frame.

For example, as illustrated in conversation context area 410, the previous user's voice utterance may be "What animation is on Video on Demand?", the previous conversation frame generated based on the utterance elements extracted from the previous voice utterance may be search_program (genre=animation), and the previous domain determined based on the previous conversation frame may be Video on Demand domain. Further, the current user's voice utterance may be "Show me animation 000," the current conversation frame generated based on the utterance elements extracted from the current voice utterance may be search_program (title=animation 000), and the current domain determined based on the current conversation frame may be TV program domain and Video on Demand domain.

Thus, when the determined domain regarding the current user's voice utterance is TV program domain, the controller 150 may determine that the current domain may be different from the previous domain determined regarding the previous voice utterance, which is Video on Demand domain. Further, the controller 150 may determine that conversation context is not converted between the different two domains by analyzing user's conversation pattern from the previous conversation frame of search_program (genre=animation) and the current conversation frame of search_program (title=animation 000).

Thus, when the two domains determined regarding the previous and the current user's voice utterance are determined to be different and when conversation context is determined not to be converted between the two domains, the controller 150 may determine a first and a second candidate frame 420, 430 to provide response information regarding the user's voice utterance on the two domains.

Specifically, the controller 150 may change the current conversation frame of search_program (title=animation 000) to play_program (title=animation 000) based on the previous conversation frame of search_program (genre=animation), and determine the changed play_program (title=animation 000) to be first candidate conversation frame 420. Further, the controller 150 may determine the current conversation frame of search_program (title=animation 000) to be second candidate conversation frame 430.

Accordingly, when the first and the second candidate conversation frame 420, 430 are determined, the controller 150 may provide response information regarding the user's voice utterance based on the determined first and second candidate conversation frames 420, 430.

Specifically, in order to provide response information regarding the first candidate conversation frame 420, the controller 150 may perform searching regarding animation 000 among the previously searched animations on Video on Demand domain, which is the previous domain, based on the previous conversation frame of search_program (genre=animation) and the first candidate conversation frame 420 of play_program (title=animation 000), and generate information to execute the searched animation 000.

Specifically, in order to provide response information regarding the second candidate conversation frame 420, the controller 150 may perform searching regarding animation 000 on TV program domain, which is the current domain, based on the second candidate conversation frame of search_program (title=animation 000), and generate searching results regarding the searched animation 000.

Thereafter, the controller 150 may generate response information including the information to execute animation 000 generated for the first candidate conversation frame 420 and the search result information regarding animation 000 generated for the second candidate conversation frame 430, and transmit the generated information to the display apparatus 200.

FIG. 5 is a diagram in which the voice recognition device determines a candidate conversation frame to provide response information regarding the user's voice utterance according to another exemplary embodiment.

Referring to FIG. 5, when the current and the previous domain are determined to be the same and when conversation context is determined to be converted between the two domains, the controller 150 may determine a candidate conversation frame related with at least one conversation frame of the current conversation frame and the initialized conversation frame regarding the current conversation frame on the previous domain.

For example, as illustrated in conversation context area 510, the previous user's voice utterance may be "What animation is on Video on Demand?", the previous conversation frame generated based on the utterance elements extracted from the previous voice utterance may be search_program (genre=animation), and the previous domain determined based on the previous conversation frame may be Video on Demand domain. Further, the current user's voice utterance may be "What action movie is on Video on Demand?", the current conversation frame generated based on the utterance elements extracted from the current voice utterance may be search_program (genre=action), and the current domain determined based on the current conversation frame may be Video on Demand domain.

In the above example, the controller 150 may determine the two domains determined regarding the previous and the current voice utterance to be Video on Demand domains. Further, the controller 150 may determine that conversation context is converted between the two domains which are the same by analyzing user's conversation pattern from the previous conversation frame of search_program (genre=animation) and the current conversation frame of search_program (genre=action).

Thus, when the two domains determined regarding the previous and the current user's voice utterance are determined to be the same and when conversation context is determined to be converted between the two domains, the controller 150 may determine a first and a second candidate conversation frame 520, 530 to provide response information regarding the user's voice utterance on Video on Demand domain which is previous domain.

Specifically, the controller 150 may change the current conversation frame of search_program (genre=action) to search_program (genre=action animation) based on the previous conversation frame of search_program (genre=animation), and determine the changed search_program (genre=action animation) to be first candidate conversation frame 520. Further, the controller 150 may determine the current conversation frame of search_program (genre=action) to be second candidate conversation frame 530.

Accordingly, when the first and the second candidate conversation frame 520, 530 are determined, the controller 150 may provide response information regarding the user's voice utterance based on the determined first and second candidate conversation frames 520, 530.

Specifically, in order to provide response information regarding the first candidate conversation frame 520, the controller 150 may perform searching on Video on Demand domain, which is the previous domain, regarding the action animation among the previously searched animations based on the previous conversation frame of search_program (genre=animation) and the first candidate conversation frame 520 of search_program (genre=action animation), and generate search result information regarding the searched action animation.

Further, in order to provide response information regarding the second candidate conversation frame 530, the controller 150 may generate search result information on Video on Demand domain, which is the previous domain, regarding contents related with the action among the contents provided on Video on Demand based on the second candidate conversation frame 530 of search_program (genre=action).

Thereafter, the controller 150 may generate response information including the search result information regarding the action animation generated for the first candidate conversation frame 520 and the search result information regarding the contents related with the action generated for the second candidate conversation frame 530, and transmit to the display apparatus 200.

FIG. 6 is a diagram in which the voice recognition device determines a candidate conversation frame to provide response information regarding the user's voice utterance according to another exemplary embodiment.

Referring to FIG. 6, when the current and the previous domain are determined to be different and when conversation context is determined to be converted between the two domains, the controller 150 may determine at least one of a candidate conversation frame regarding the current conversation frame based on the previous conversation frame, a candidate conversation frame regarding the current conversation frame on the previous domain, and a candidate conversation frame regarding the initialized conversation frame related with the current conversation frame on the current domain.

For example, as illustrated in conversation context area 610, the previous user's voice utterance may be "What animation is on Video on Demand?", the previous conversation frame generated based on the utterance elements extracted from the previous voice utterance may be search_program (genre=animation), and the previous domain determined based on the previous conversation frame may be Video on Demand domain. Further, the current user's voice utterance may be "Then, what TV programs are on?," the current conversation frame generated based on the utterance elements extracted from the current voice utterance may be search_program ( ) and the current domain determined based on the current conversation frame may be TV program domain.

In the above example, the controller 150 may determine the determined domains regarding the previous and the current voice utterance to be different. Further, the controller 150 may determine that conversation context is converted between the different two domains by analyzing user's conversation pattern from the previous conversation frame of search_program (genre=animation) and the current conversation frame of search_program ( ).

Accordingly, when the two domains determined regarding the previous and the current user's voice utterance are different and when conversation context is determined to be converted between the two domains, the controller 150 may determine a first to a third candidate conversation frames 620~640 to provide response information regarding the user's voice utterance on the two domains.

Specifically, the controller 150 may change the current conversation frame of search_program ( ) to search_program (genre=animation) based on the previous conversation frame of search_program (genre=animation), and determine the changed search_program (genre=animation) to be first candidate conversation frame 620. Further, the controller 150 may determine the current conversation frame of search_program ( ) to be second candidate conversation frame 630. Further, the controller 150 may determine the initialized conversation frame regarding the current conversation frame to be third candidate conversation frame 640. Herein, the initialized conversation frame may be similar to the current conversation frame of search_program ( ) because the current conversation frame indicates search_program ( ). When the current conversation frame is generated based on main action and parameters corresponding to the first and the second utterance element, the initialized conversation frame may be generated based on the main action corresponding to the first utterance element except for the parameters corresponding to the second utterance element.

When the first to the third candidate conversation frames 620~640 are determined, the controller 150 may provide response information regarding the user's voice utterance based on the determined first to third candidate conversation frames 620~640.

Specifically, to provide response information regarding the first candidate conversation frame 620, the controller 150 may perform searching regarding the animation on TV program domain which is current domain based on the first candidate conversation frame 620 of search_program (genre=animation), and generate search result information regarding the searched animation.

Further, to provide response information regarding the second candidate conversation frame 630, the controller 150 may generate search result information regarding TV program-related contents provided from TV program on Video on Demand domain, which is the previous domain based on the second candidate conversation frame 630 of search_program ( ).

Further, to provide response information regarding the third candidate conversation frame 640, the controller 150 may generate search result information regarding TV program-related contents provided from TV program on TV program domain, which is current domain, based on the third candidate conversation frame 640 of search_program ( ).

Thereafter, the controller 150 may generate response information including the search result information regarding the animation generated for the first candidate conversation frame 620 and the search result information regarding TV-program related contents generated for the second and the third candidate conversation frame 630, 640, and transmit to the display apparatus 200.

Meanwhile, the controller 150 may determine ranking according to the preset condition regarding at least one candidate conversation frame determined based on the above exemplary embodiments, and provide response information regarding the candidate conversation frame following to the ranking of the candidate conversation frame from the highest.

According to an exemplary embodiment, the controller 150 may determine ranking of at least one candidate conversation frame previously determined based on counting information matched with conversation example information for each of the at least one previous conversation frames pre-stored in the storage 160. Thereafter, the controller 150 may provide response information regarding corresponding candidate conversation frame from the highest order of the candidate conversation frame based on the determined ranking.

Specifically, as described above, the storage 160 may store the domain tables matched with the previous conversation frames based on the utterance elements extracted from the user's previous voice utterance respectively regarding a plurality of the preset domains. Further, the storage 160 may match and store the conversation example information related with the previous conversation frame matched respectively with a plurality of the domains and the counting information according to the frequency regarding the user's voice utterance related with the conversation example information.

For example, Video on Demand domain and TV program domain may be matched with the previous conversation frame regarding search_program (genre=animation). Further, the previous conversation frame regarding search_program (genre=animation) matched per domain may be matched with the conversation example information related with the user's previous voice utterance such as "What animation is on?" and "Show me the animation" and the counting information according to the frequency regarding the user's voice utterance related with corresponding conversation example information.

Thus, when a plurality of the candidate conversation frames are determined, the controller 150 may determine ranking respectively regarding the candidate conversation frames based on the counting information regarding the conversation example information matched per determined candidate conversation frame.

For example, as illustrated in FIG. 6, the first to the third candidate conversation frames 620~640 may be determined, in which the conversation example information related with the first candidate conversation frame 620 regarding search_program (genre=animation) on TV program domain may have the highest frequency, and the conversation example information related with the second candidate conversation frame 630 regarding search_program ( ) on Video on Demand domain may have the lowest frequency.

In the above example, the controller 150 may generate response information including the search result information generated based on the first to the third candidate conversation frames 620~640 and the ranking information regarding the first to the third candidate conversation frames 620~640, and transmit the result to the display apparatus 200. Accordingly, the display apparatus 200 may respectively display the search result information in the order of higher-ranking candidate conversation frame based on the ranking information included in the received response information.

According to another exemplary embodiment, the controller 150 may provide the response information regarding the candidate conversation frame in the order of larger number of indexing information among the candidate conversation frames to provide response information regarding the user's voice utterance by considering the indexing information regarding the conversation example information for each one of the at least one previous conversation frames which is previously stored in the storage 160.

Specifically, the storage 160 may further store the indexing information to index at least one utterance element included in the conversation example information for each one of the at least one previous conversation frames. For example, the previous conversation frame regarding search_program (genre=animation) may be conversation frame generated based on the first and the second utterance element, and include the indexing information respectively regarding the first and the second utterance elements. Meanwhile, the previous conversation frame regarding search_program ( ) may be conversation frame generated based on the first utterance element, and may include only the indexing information regarding the first utterance element.

Thus, when a plurality of the candidate conversation frames are determined, the controller 150 may determine ranking regarding a plurality of the candidate conversation frames in the order of larger number of indexing information by considering a number of the indexing information respectively regarding the utterance elements constituting the respective candidate conversation frames. Thereafter, the controller 150 may generate response information including the search result information respectively regarding the candidate conversation frames and the ranking information determined per candidate conversation frame, and transmit the result to the display apparatus 200.

Thus, the display apparatus 200 may respectively display the search result information in the order of the higher-ranking candidate conversation frame, based on the ranking information included in the received response information.

The above specifically describe each configuration of the voice recognition device 100 providing response information corresponding to the user's voice utterance in the interactive system according to an exemplary embodiment. The following will specifically explain a method for providing response information corresponding to the user's voice utterance in the voice recognition device 100 of the interactive system according to an exemplary embodiment.

Figure 7:
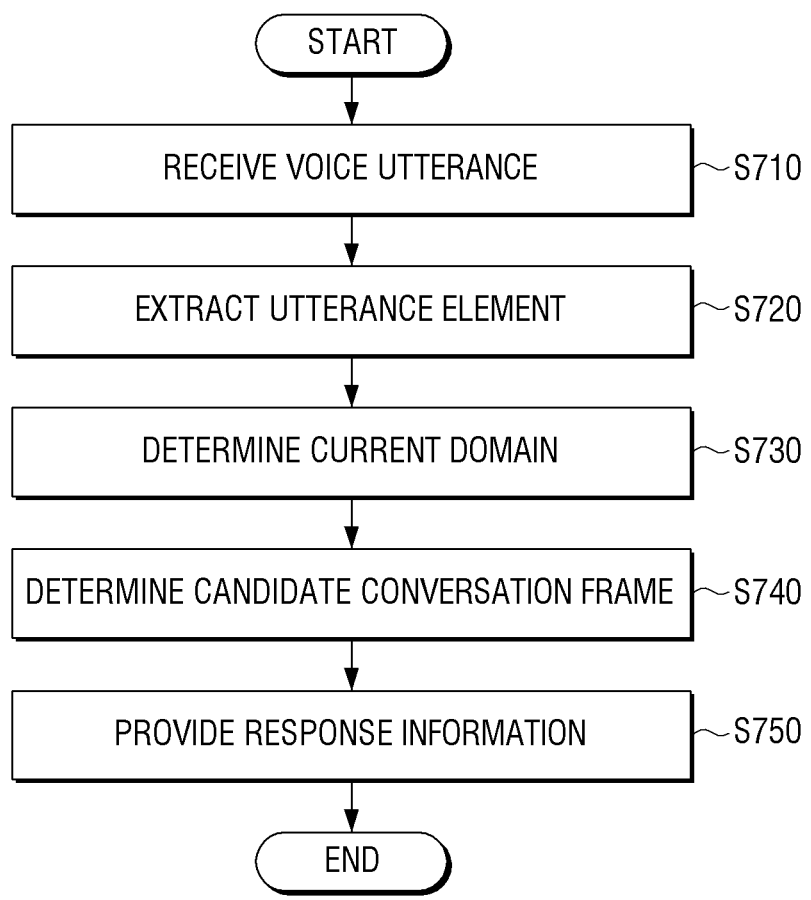
FIG. 7 is a flowchart describing a method for providing response information corresponding to the user's voice utterance in a voice recognition device according to an exemplary embodiment.

FIG. 7 is a flowchart describing the method for providing response information corresponding to the user's voice utterance in the voice recognition device according to an exemplary embodiment.

Referring to FIG. 7, the voice recognition device 100 may extract at least one utterance element among the first utterance element indicating execution commands and the second utterance element indicating a subject from the received voice utterance, at S710 and S720, when the collected user's voice utterance signals (hereinbelow, "voice utterance") are received from the display apparatus 200.

Specifically, the voice recognition device 100 may recognize and convert the received user's voice utterance into the text when the user's voice utterance is received from the display apparatus 200. According to an exemplary embodiment, the voice recognition device 100 may convert the received user's voice utterance into the text by using STT algorithms. When the user's voice utterance is converted into the text, the voice recognition device 100 may extract at least one utterance element among the first utterance element indicating execution commands and the second utterance element indicating a subject from the user's voice utterance converted into text. For example, regarding the user's voice utterance speaking "Show me action movies!," the voice recognition device 100 may extract the first utterance element indicating the execution command of "show!" and the second utterance element indicating the subject "action movies."

When the utterance elements are extracted, the voice recognition device 100 may determine the current domain to provide response information regarding the user's voice utterance based on the extracted first and second utterance elements, at S730. Specifically, the voice recognition device 100 may determine the current domain to provide response information regarding the user's voice utterance based on main action and parameters corresponding to the pre-extracted first and second utterance elements. More specifically, the voice recognition device 100 may generate the current conversation frame based on main action and parameters corresponding to the first and the second utterance element extracted from the user's voice utterance. When the current conversation frame is generated, the voice recognition device 100 may determine the current domain to which the current conversation frame belongs by considering the preset domain tables. Herein, the domain tables may be matched with the conversation frame generated based on the main action corresponding to the first utterance element extracted from the previous user's voice utterance and the parameters corresponding to the second utterance element, respectively regarding a plurality of the preset domains.

Thus, the voice recognition device 100 may obtain at least one domain to which the current conversation frame belongs by considering the previously stored domain tables and determine the obtained domain to be current domain when the current conversation frame is generated.

When the current domain regarding the user's voice utterance is determined, the voice recognition device 100 may determine a candidate conversation frame to provide response information regarding the user's voice utterance on at least one of the current and the previous domain based on conversation state between the current domain and previous domain determined from the previous voice utterance of corresponding user, at S740.

Specifically, when the current domain regarding the user's voice utterance is determined, the voice recognition device 100 may determine whether the current domain and the previous domain are the same, and whether conversation context is converted from the current conversation frame and the previously generated conversation frame regarding the previous domain. Thereafter, the voice recognition device 100 may determine a candidate conversation frame to provide response information regarding the user's voice utterance on at least one of the current and the previous domain according to the determining result regarding whether the two domains are the same and whether conversation context is converted.

According to an exemplary embodiment, when the current domain and the previous domain are determined to be the same and when conversation context is determined not to be converted between the two domains, the voice recognition device 100 may determine a candidate conversation frame regarding the current conversation frame based on the previous conversation frame.

Meanwhile, when the current domain and the previous domain are determined to be different and when conversation context is determined not to be converted between the two domains, the voice recognition device 100 may determine a candidate conversation frame regarding the current conversation frame on the previous and the current domain based on the previous conversation frame.

Meanwhile, when the current domain and the previous domain are determined to be the same and when conversation context is determined to be converted between the two domains, the voice recognition device 100 may determine a candidate conversation frame on the previous domain regarding at least one conversation frame among the current conversation frame and the initialized conversation frame regarding the current conversation frame.

Meanwhile, when the current domain and the previous domain are determined to be different and when conversation context is determined to be converted between the two domains, the voice recognition device 100 may determine at least one of a candidate conversation frame regarding the current conversation frame based on the previous conversation frame, a candidate conversation frame regarding the current conversation frame on the previous domain, and a candidate conversation frame regarding the initialized conversation frame related with the current conversation frame on the current domain.

Accordingly, when at least one candidate conversation frame is determined according to whether the current and the previous domain are the same and whether conversation context is converted between the two domains, the voice recognition device 100 may generate response information regarding the determined candidate conversation frame, and transmit the generated response information to the display apparatus 200 at S750.

Specifically, the voice recognition device 100 may determine ranking according to a preset condition regarding at least one candidate conversation frame determined based on the above exemplary embodiments, and provide the response information regarding the candidate conversation frame in the order of higher-ranking candidate conversation frame.

According to an exemplary embodiment, the voice recognition device 100 may determine ranking of at least one pre-determined candidate conversation frame based on the counting information matched with the conversation example information per at least one stored previous conversation frame. Thereafter, the voice recognition device 100 may provide the response information regarding corresponding candidate conversation frame in the order of higher-ranking candidate conversation frame based on the determined ranking to the display apparatus 200.

Specifically, the voice recognition device 100 may match and store the previous conversation frame matched respectively regarding a plurality of domains, the conversation example information related with the previous conversation frame matched per domain, and the counting information according to the frequency information regarding the user's voice utterance related with the conversation example information before the above described processes.

Thus, when a plurality of the candidate conversation frames are determined, the voice recognition device 100 may determine ranking per candidate conversation frame based on the counting information regarding the conversation example information matched per candidate conversation frame. When the ranking regarding a plurality of the candidate conversation frames are determined, the voice recognition device 100 may generate response information including the search result information respectively generated based on a plurality of the candidate conversation frames and the ranking information per candidate conversation frame, and transmit to the display apparatus 200. Thus, the display apparatus 200 may display each search result information in the order of higher-ranking candidate conversation frame based on the ranking included in the received response information.

According to another exemplary embodiment, the voice recognition device 100 may determine ranking of the candidate conversation frame in the order of larger number of the indexing information among the candidate conversation frames to provide response information regarding the user's voice utterance by considering the indexing information of the conversation example information per at least one previous conversation frame which is previously stored. Thereafter, the voice recognition device 100 may generate response information including the search result information per candidate conversation frame and the ranking information determined per candidate conversation frame, and transmit the result to the display apparatus 200.

Therefore, the display apparatus 200 may display each search result information in the order of higher-ranking candidate conversation frame based on the ranking included in the received response information.

The exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs).

The devices and methods described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an application specific integrated circuit (ASIC). Additionally, the ASIC may reside in a user terminal. Alternatively, the processor and the storage medium may reside as discrete components in a user terminal.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

The invention claimed is:

1. A voice recognition device for controlling a display device using a voice utterance of a user, the voice recognition device comprising:
an extractor configured to extract at least one of a first utterance element indicating an execution command and a second utterance element indicating a subject, from the voice utterance of the user;
a domain determiner configured to generate a current conversation frame based on the first and second utterance elements, and determine a current domain to provide response information regarding the voice utterance based on the generated current conversation frame, wherein the current domain is determined by matching information stored in domain tables with the current conversation frame based on the first and second utterance elements; and
a controller configured to determine a candidate conversation frame to provide the response information regarding the voice utterance on at least one of the current domain and a previous domain based on a conversation state of the current domain,
wherein the previous domain is determined from a previous voice utterance of the user,
wherein, when the current domain determined using the stored domain tables is different from the previous domain, and when a conversation context is converted between the two domains, the controller is further configured to determine at least one of a candidate conversation frame regarding the current conversation frame based on a previous conversation frame, a candidate conversation frame regarding the current conversation frame on the previous domain, and a candidate conversation frame regarding an initialized conversation frame initialized in relation with the current conversation frame on the current domain, and wherein the voice utterance is collected from the user by the display device, and the response information is output to the user through at least one of a screen of the display device and a speaker of the display device.

2. The voice recognition device of claim 1, wherein the domain determiner is further configured to determine the current domain to provide response information regarding the voice utterance based on a main action and parameters corresponding to the first and the second utterance elements extracted by the extractor.

3. The voice recognition device of claim 2, wherein the controller is further configured to determine whether or not the current domain and the previous domain are the same and whether the conversation context is converted from the current conversation frame and the previous conversation frame generated regarding the previous domain, and determine a candidate conversation frame to provide response information regarding the voice utterance on at least one of the current domain and the previous domain.

4. The voice recognition device of claim 3, wherein, when the current domain and the previous domain are the same and when the conversation context is not converted between the current domain and the previous domain, the controller is further configured to determine the candidate conversation frame regarding the current conversation frame based on the previous conversation frame.

5. The voice recognition device of claim 3, wherein, when the current domain and the previous domain are different and when the conversation context is not converted between the current domain and the previous domain, the controller is further configured to determine the candidate conversation frame regarding the current conversation frame on the previous and the current domains based on the previous conversation frame.

6. The voice recognition device of claim 3, wherein, when the current domain and the previous domain are the same and when the conversation context is converted between the two domains, the controller is further configured to determine the candidate conversation frame from at least one of the current conversation frame and an initialized conversation frame which is initialized in relation with the current conversation frame on the previous domain.

7. The voice recognition device of claim 1, further comprising:
a memory configured to store conversation example information related with the previous conversation frame matched for each domain, and counting information relating to a frequency regarding the voice utterance related with the conversation example information.

8. The voice recognition device of claim 7, wherein the controller is further configured to determine ranking of the candidate conversation frame based on the counting information matched with the conversation example information for each of at least one previous conversation frame stored in the memory, and provide response information regarding the candidate conversation frame in an order of higher-ranking candidate conversation frame.

9. The voice recognition device of claim 7, wherein the memory is further configured to store indexing information to index at least one utterance element included in the conversation example information for each of at least one previous conversation frame, and
the controller is further configured to provide response information regarding the candidate conversation frame in an order of larger number of the indexing information among the candidate conversation frames to provide response information regarding the voice utterance by considering the indexing information of the conversation example information for each of the at least one previous conversation frame stored in the memory.

10. A method of controlling a voice recognition device for controlling a display device using a voice utterance of a user, the method comprising:
extracting at least one of a first utterance element indicating an execution command and a second utterance element indicating a subject from the voice utterance of the user;
generating a current conversation frame based on the first and second utterance elements;
determining a current domain to provide a response information regarding the voice utterance based on the generated current conversation frame, wherein the current domain is determined by matching information stored in domain tables with the current conversation frame based on the first and second utterance elements;
determining a candidate conversation frame to provide the response information regarding the voice utterance on at least one of a current domain and a previous domain, based on a conversation state on the current domain and the previous domain, wherein the previous domain is determined from a previous voice utterance of the user; and
providing the response information regarding the voice utterance based on the candidate conversation frame,
wherein, when the current domain determined using the stored domain tables is different from the previous domain, and when a conversation context is converted between the two domains, the providing comprises determining at least one of a candidate conversation frame regarding the current conversation frame based on a previous conversation frame, a candidate conversation frame regarding the current conversation frame on the previous domain, and a candidate conversation frame regarding an initialized conversation frame initialized in relation with the current conversation frame on the current domain, and
wherein the voice utterance is collected from the user by the display device, and the response information is output to the user through at least one of a screen of the display device and a speaker of the display device.

11. The method of claim 10, wherein the determining comprises determining the current domain to provide response information regarding the voice utterance based on a main action and parameters corresponding to the extracted first and second utterance elements.

12. The method of claim 11, wherein the providing comprises determining whether the current domain and the previous domain are the same and whether a conversation context is converted from the current conversation frame and a previous conversation frame generated regarding the previous domain, and determines a candidate conversation frame to provide response information regarding the voice utterance on at least one of the current and the previous domains.

13. The method of claim 12, wherein, when the current domain and the previous domain are the same and when the conversation context is not converted between the two domains, the providing comprises determining a candidate conversation frame regarding the current conversation frame based on the previous conversation frame.

14. The method of claim 12, wherein, when the current domain and the previous domain are different and when the conversation context is not converted between the two domains, the providing comprises determining a candidate conversation frame regarding the current conversation frame on the previous and the current domains based on the previous conversation frame.

15. The method of claim 12, wherein, when the current domain and the previous domain are the same and when the conversation context is converted between the two domains, the providing comprises determining a candidate conversation frame from at least one of the current conversation frame and an initialized conversation frame which is initialized in relation with the current conversation frame on the previous domain.

16. The method of claim 10, further comprising:
matching and storing conversation example information related with the previous conversation frame matched for each domain, and counting information relating to a frequency regarding the voice utterance related with the conversation example information.

17. The method of claim 16, further comprising:
determining ranking of the candidate conversation frame based on the counting information matched with the conversation example information for each of at least one previous conversation frame;
and providing response information regarding the candidate conversation frame in an order of higher-ranking candidate conversation frame.

18. The method of claim 16, further comprising:
storing indexing information to index at least one utterance element included in the conversation example information for each of at least one previous conversation frame; and
providing response information regarding the candidate conversation frame in an order of larger number of the indexing information among the candidate conversation frames to provide response information regarding the voice utterance by considering the indexing information of the conversation example information for each of the at least one previous conversation frame.

* * * * *